Dec. 6, 1932.  E. W. BRANDT  1,890,176
MECHANICAL DELAY FUSE FOR ROTATIVE PROJECTILES
Filed Jan. 25, 1932  5 Sheets-Sheet 2
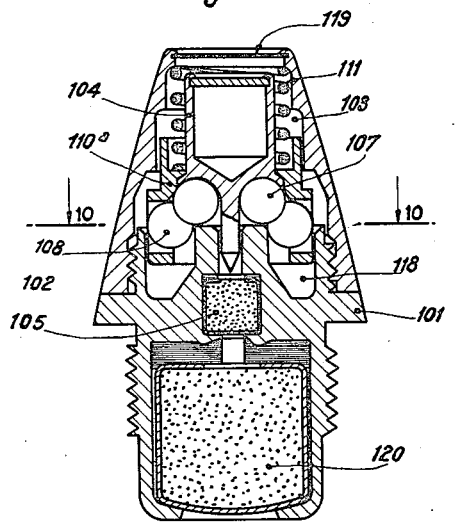
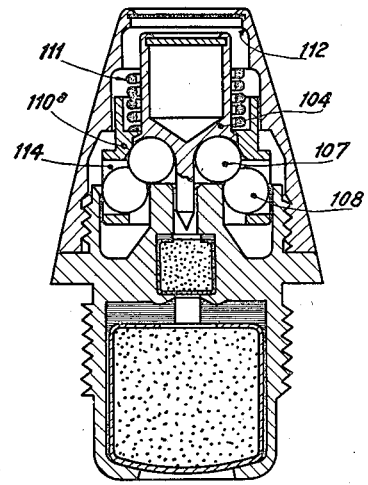
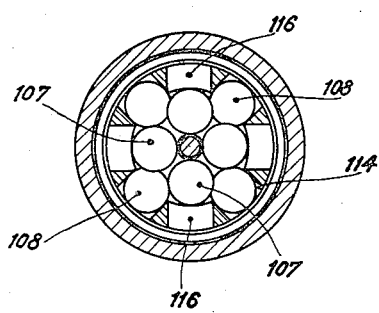
Inventor,
Edgar W. Brandt.
By Attorneys.

Dec. 6, 1932.       E. W. BRANDT       1,890,176
MECHANICAL DELAY FUSE FOR ROTATIVE PROJECTILES
Filed Jan. 25, 1932       5 Sheets-Sheet 3
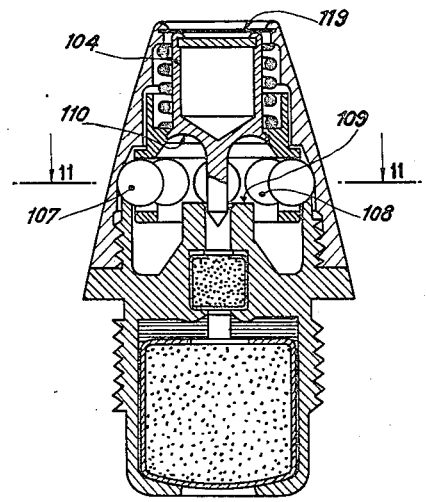
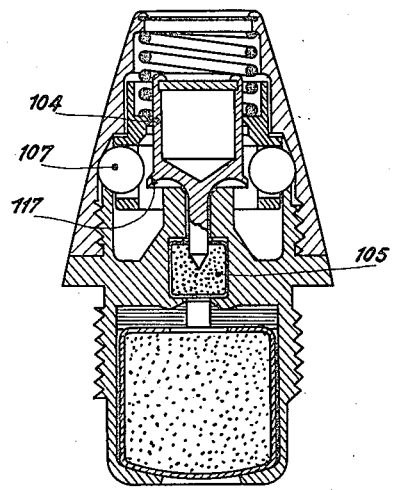
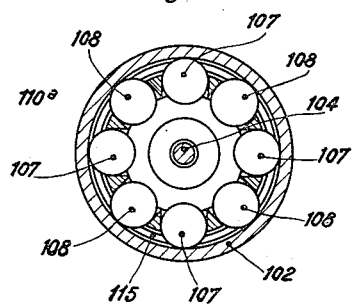
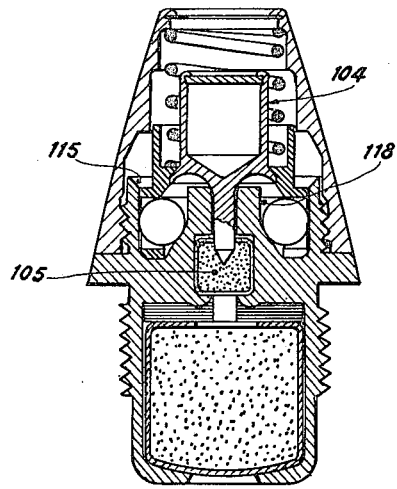
Inventor,
Edgar W. Brandt.
By
Attorneys.

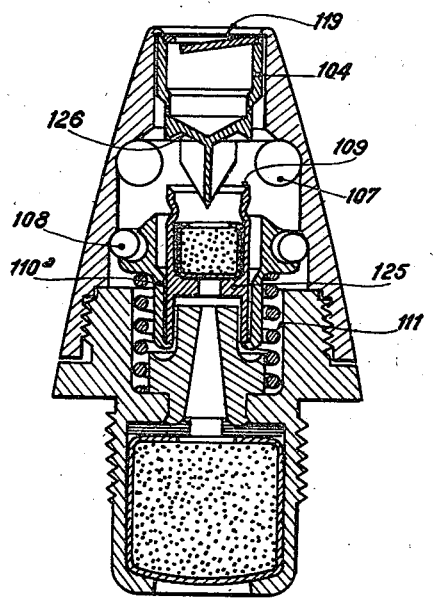
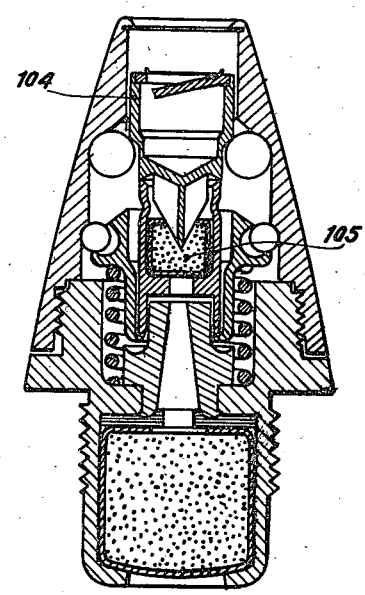
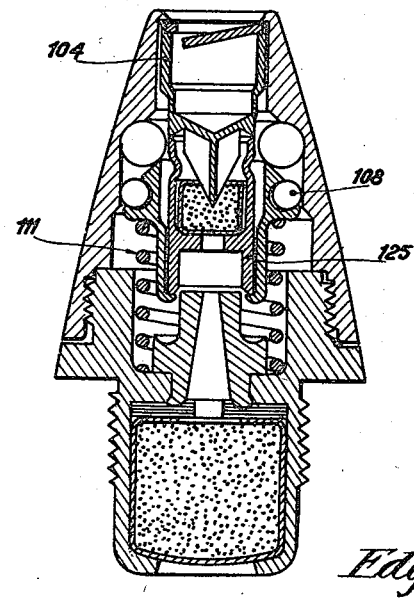

Patented Dec. 6, 1932

1,890,176

UNITED STATES PATENT OFFICE

EDGAR WILLIAM BRANDT, OF PARIS, FRANCE

MECHANICAL DELAY FUSE FOR ROTATIVE PROJECTILES

Application filed January 25, 1932, Serial No. 588,730, and in France January 24, 1931.

The present invention has for object a mechanical delay fuse for rotative projectiles. It concerns more especially a fuse of this type of certain and assured operation, comprising a device for absolute safety against risks of premature explosion during the course of transportation and handling as well as in case of striking an unforeseen obstacle either within the bore of the gun or on passing from the gun mouth, and for a safety distance which may be regulated as desired.

This fuse is remarkable, especially, in the following characteristics, whether considered separately or in combinations:

Its mechanical delay device is formed by a bolt operating by centrifugal action for retaining the firing elements (firing pin and primer) away from one another during the course of flight, so long as the speed of rotation of the projectile remains greater than a predetermined value, and for liberating them subsequently to permit the ignition of the fuse by the action of an appropriate mechanism.

A complementary safety system retains the firing elements in inactive position up to the moment of firing.

This system is formed preferably of a device which is brought out of action by inertia at the moment of firing and is constructed and arranged in some manner as to return automatically into latching position in case of encounter with an unforeseen obstacle within the safety distance.

The delay fuse is combined with a percussion fuse of the type described in my copending patent application Serial No. 539,382, filed May 22, 1931, and entitled "Fuse for rotating projectiles", in such manner as to constitute a mixed fuse, i. e. one operating by timing or by percussion.

According to another embodiment of the invention the percussion and time devices are closely combined in such a manner as to reduce the number of parts to a minimum and the fuse comprises only one set of firing elements (one firing pin and one primer) suitably arranged to cause the ignition of the primer as well under the effect of the impact, as under the effect of the mechanical delay device controlled by the decrease of the rotative speed of the projectile.

The safety system comprises an elastic element which serves also to cause, at a predetermined moment, an automatic operation of ignition of the fuse.

Other advantages and peculiarities of the invention will appear from the following description.

On the accompanying drawings given solely by way of example:

Figure 5 is an axial section of another embodiment of a fuse according to the present invention, with the parts in position of rest;

Figures 6 and 7 are analogous views showing respectively the positions taken by the parts of the fuse at the moment of firing and after the fuse has been armed or cocked;

Figures 8 and 9 show respectively, in the same manner, the positions taken by the parts at the moment of the impact and at that of the automatic operation of the fuse on the last part of the projectile trajectory;

Figure 10 is a cross section on the line 10—10 of Fig. 5;

Figures 11 is a cross section on the line 11—11 of Fig. 6;

Figures 13 and 14 are analogous views showing respectively the positions taken by the parts at the moment of firing and after the fuse has been armed or cocked;

Figures 15 and 16 show respectively, in the same manner, the positions taken by the parts at the moment of the impact and at that of the automatic operation of the fuse on the last part of the projectile trajectory;

Figure 1:
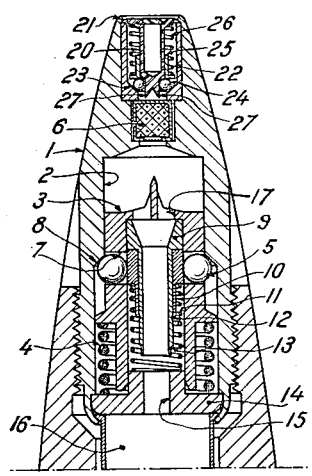
Figure 1 is an axial section of a fuse according to this invention, with the parts in the position of rest.

According to the example of execution illustrated, the fuse comprises a body 1, having a cavity 2 in which may slide a firing pin 3 which is forced forward by a spring 4. One or more displaceable retaining elements such as the balls 5, are provided and arranged in such manner as to retain the firing pin 3 in the safety position away from a primer 6, which is held fixed in the body 1. For this purpose, in the present example, the balls 5 are disposed in perforations 7 of the firing pin 3 and abut against a shoulder 8 which forms a ramp of suitable angle. A bushing 9 carries a ring 10 and normally retains the balls 5 in the position of Figure 1 under the action of spring 11. The ring 10 may slide on the bushing 9 whereby to pass from the position of Figure 1 to that of Figure 2. It is retained in one of the other positions by suitable means. Thus a slit ring may be employed having a certain elasticity, and retained at 12 in a groove of bushing 9 and capable of hooking or engaging itself, after unlatching, behind a shoulder 13 on the bushing 9.

The assembly of the mechanism rests, at its rear, against a piece 14. This piece is pierced by an aperture 15 affording access to the detonator 16 which is suitably seated on the body 1. To permit the transmission of the flame from the primer 6 to the detonator 16, one or more passages may be provided. For this purpose, the firing pin is preferably perforated as shown at 17.

In the illustrated form of execution the fuse comprises further, at its front, a percussion device of the type described in my aforesaid application.

This device comprises a firing pin 20 retained on the bushing 22, by crimping at 21 or in another manner, and being preferably removable, this bushing 22 having its lower portion 23 formed as a seat for balls 24. The latter are maintained in the latching position by a ring 25 which is under the action of a spring 26. Preferably a hollow firing pin is employed with a view of reducing its mass to a minimum and thus increasing the sensitivity of the fuse. This firing pin may advantageously comprise two points 27 as shown.

Figure 2:
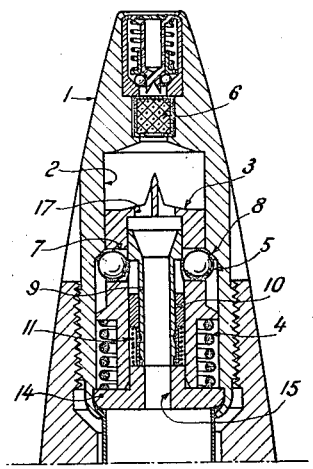
Figures 2, 3 and 4 are analogous views showing respectively the positions taken by the parts of the fuse at the moment of firing, after cessation of the positive acceleration, and at the moment of operation.

The operation is as follows, in case the projectile does not encounter any obstacle during its course of flight:

At the moment of firing the parts assume by inertia the position of Figure 2. The bushing 9 and the ring 10 remain back while compressing their spring 11. Further, under the effect of the shock of the bushing 9 against the piece 14 the ring 10 overcomes by inertia, the resistance of its retaining device 12 and comes to hook itself over the shoulder 13. During this time, the firing pin 3 remains immobile by reason of its inertia, and bears against the piece 14.

Figure 3:
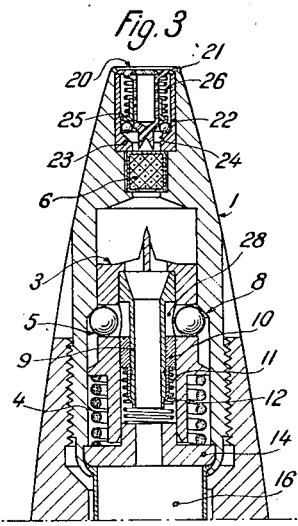
Figure 4:
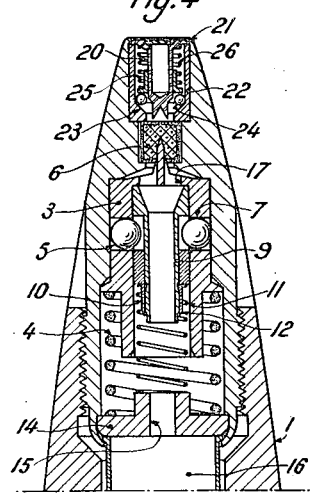

When the positive acceleration of the projectile becomes less than that which the spring 11 tends to communicate to bushing 9 and to ring 10, this spring pushes these parts into the position of Figure 3, i. e. into a position for possible unlatching of the firing pin 3; the change of position of the ring 10 leaves a free space 28 for the balls 5, in which they may be lodged. In any case, this unlatching may only occur when the speed of rotation of the projectile has decreased sufficiently to permit the firing pin 3, pressed by the spring 4, to displace the balls forwardly along the slope of the shoulder 8 by overcoming the action of centrifugal force which has theretofore maintained them in the position of Figure 3. When the firing pin 3 is liberated, its spring 4 projects it onto the primer 6 whose deflagration causes the ignition of the detonator 16 (Figure 4).

The percussion device mounted at the front of the fuse does not come into play, in the illustrated example, since the projectile is assumed not to encounter any obstacle. The firing pin 20 remains immovable by reason of its retaining device 21 and the balls 24 simply cause unlatching and, finally, the relatching of the fuse, in the manner described in the aforesaid application.

In case, on the contrary, the projectile encounters its objective beyond the safety distance from the gun mouth, and before the operation of the time fuse, the firing pin 20 is then unlatched and is abruptly stopped by the obstacle, the retaining device 21 is cut or broken away, and the primer 6 fixed to the body 1 is brought by its continued forward movement with the projectile onto the firing pin 20, and thus produces the firing.

The time and percussion devices may be adjusted in such manner as to obtain a fuse which will operate by time, by percussion, or mixed, at one or more parts of the trajectory of the projectile, and these may be adjusted as desired.

Thus, for example, for firing against airships, it may be arranged in such manner that the time device causes a systematic destruction of the projectile during the descending portions of its flight, in case it has not encountered its objective.

Further, in case of encountering an unforeseen obstacle in the gun bore or even within a certain distance of the latter, the abrupt slowing down of the projectile causes the instantaneous return, by inertia, of the bushing 9 into the position of Figure 1. The shock of the bushing 9 at the bottom of its stroke, against the firing pin 3, thus provokes the return of the ring 10 into the latching position (Figure 1) before the balls 5 have had time to move appreciably on the shoulder 8, the slope of this shoulder, the force of the springs, and the mass of the different elements, being adjusted and arranged for that purpose.

In case the encounter of an unforeseen obstacle occurs beyond the safety distance from the gun mouth, after the return of the bushing 9 into the forward position (Figure 3) and a considerable slowing down of the projectile is thus caused, the inertiia of the ring 10 itself will be sufficient to permit it to overcome the action of its retaining engagement at 13 and to return it instantly into the latching position under the same conditions as before.

Any accidental percussion is thus rendered impossible in these cases. An analogous safety is attained by the balls 24 of the percussion device.

The safety distance for the time fuse may naturally be adjusted, as desired, by controlling the mass and the path of travel for the different elements contributing to the latching, by the force of the springs, by the slope of the shoulder 8, etc.

In case of dropping or accidental shocks during the course of transport and handling, for example onto the base of the projectile, no functioning of the time fuse can be produced, as the spring 11 and the retaining part 12 of the ring 10 have an appropriately selected resistance for this purpose. In case of a fall on the nose, the inertia of the pieces will be sufficient to retain them in latching position. The percussion device has an analogous safety, but operating in inverse direction in the two cases, as described in the aforesaid application. It will be understood that the latching of the firing pin may be accomplished by other means than the balls, and the positions of the firing pin and of the primer may be reversed without changing the principle of the invention. The latching of the fuse, before firing, may also be attained by other systems than those described and shown.

Thus it is possible to utilize for this purpose a centrifugal bolt acting on the balls or analogous elements, or even totally independent of the latter.

It may be remarked further that the delay fuse according to this invention may be utilized either alone, or in combination with any type of percussion fuse. It is particularly advantageous, in many cases, to combine it with a percussion fuse of the type described, in such manner as to have a mixed fuse combining the advantages of the two devices and assuring the relatching of the percussion system at the end of the flight. Thus, the explosion of the projectile after its fall to the ground is prevented, as in a case where the mechanical delay device may be disrupted.

If, however, for certain applications, this explosion is desired, it is sufficient to slightly modify the seat 30 for the balls 24 in such manner as to provide at its upper portion, a sort of resting place onto which the balls 24 are obliged to bear, after unlatching, under the action of the bushing 25 as pushed by the spring 26. Consequently, no relatching of the firing pin 20 may take place, and the fuse operates normally at the fall of the projectile onto the ground.

Although the fuse according to this invention is particularly interesting in case of application to projectiles of small caliber, whose rotative speed decreases considerably in the course of flight, it is evident that its application to all other projectiles is only a question of adjustment and restricting the tolerances.

It may be remarked further that for permitting the operation of the fuse according to this invention on projectiles of all calibers, it is sufficient to adjust or suitably amplify the reduction of rotative speed to which the projectiles are subject during flight, by aid of suitable means.

According to the example of execution of Figs. 5 to 11, the fuse comprises a body 101 to which is fastened a nose piece 102, having a cavity 103 in which may longitudinally slide a firing pin 104. The firing pin 104 is preferably made hollow internally as shown in the drawings. In a line with the firing pin 104 is disposed a primer 105 which is fixed in the body 101. The firing pin is normally retained apart from the primer 105 by a safety device, which according to the present example, comprises balls distributed in two concentrical crowns, 107 and 108. The firing pin 104 bears directly upon the balls 107, of the upper crown, which bear themselves upon a fixed bearing 109 of the fuse body 101. The firing pin 104 may preferably comprise, on its lower side, a neck part 110 (Fig. 7) which has the same diameter as the balls 107, in order that the balls 107 may be imprisoned for more than an hemisphere between the firing pin and the bushing 109, when the fuse is in the position of rest (Figs. 5 and 10). The balls 107 are moreover locked by a bushing 110$^a$ which may axially slide in the fuse body and is urged rearward by a spring 111. The spring 111 rests, by its other end, upon a shoulder 112 of the nose piece 102. The bushing 110$^a$ comprises, in its lower part a number of radially extending lodgings 114, in which are disposed the balls 108 of the lower crown. The fuse body comprises, opposite the balls 108, a conical surface 115 (Fig. 9). Between the lodgings of the balls 107 are disposed others radially extending lodgings 116 which are able to accommodate the balls 107 of the upper crown when the bushing 110$^a$ is pushed forward by a sufficient length. All these lodgings 114 and 116 are symmetrically distributed around the axis of the fuse so as to assure a good balance of the fuse. The balls of the lower crown 107 and of the upper crown 108, are preferably, distributed according to a quincuncial arrangement, as shown in Fig. 10, in order to be perfectly interlocked both in the lateral and longitudinal directions.

The bushing 110ª rests, rearwards, upon a collar 117 (Fig. 8) of the firing pin 104, so that the spring 111 is able to act upon both the bushing and the firing pin, as will be explained hereafter.

A recess 118 of the fuse body is designed to receive the bushing 110ª together with the balls 107 and 108 when the automatical operation of the fuse occurs.

A plate 119, conveniently fixed in the fuse nose 102, assures the tightness of the device. In position of rest, the firing pin is preferably maintained apart from this plate 119 by the spring 111, as shown in Fig. 5.

A booster 120 is preferably mounted in the fuse body itself and is disposed at the rear of the primer 105 with a view of transmitting the ignition of the primer to the charge of the projectile.

The operation is as follows:

When the fuse is in the position of rest, the safety device 107, 108, 110ª, 111, locks the firing pin 104 in the position of Fig. 5. Accordingly every untimely firing movement of the firing pin is prevented during the course of transport and handling. It is the same thing also in case of accidental braking of the projectile in the tube.

At the moment of firing, the parts take, by inertia, the position shown in Fig. 6. The firing pin 104 and the bushing 110ª bear upon the balls 107 and maintain them in the locking position. The spring 111 is compressed upon it itself as shown.

When the positive acceleration of the projectile has ceased, the balls 108 separate from the firing pin under the effect of the centrifugal force and fly upward on the conical bearing 115 pushing forward the bushing 110ª against the action of the spring 111. The movement of the bushing 110ª frees the balls 107. In effect, as soon as the holes 116 in the bushing 110ª register with the balls 107, these balls fly into the holes freeing the firing pin 104 which under the action of the negative acceleration imparted to the projectile by air resistance, comes to bear against the plate 119. The fuse is thus in armed or cocked position (Figs. 7 and 11). The time necessary for the balls 107 and 108 to pass from the position of Fig. 6 to that of Fig. 7 provides for the "security of the mouth".

At the moment of impact, the fuse operates by direct action of the obstacle against the firing pin which is driven backward. The operation of the fuse takes place with an utmost sensitivity because there is no longer any safety device between the firing pin 104 and the primer 105, at the moment of impact.

In case, on the contrary, the projectile fired, for example, against an aerial objective, pursues its trajectory without encountering the target, a moment arrives when, under the effect of the decrease of the gyratory speed caused by air resistance, the centrifugal force of the balls 107 and 108 is no longer sufficient to overcome the action of the spring 111. The latter spring drives then the balls in the recess 116 and projects at the same time the firing pin 104 into the primer 105 (Fig. 9).

The time device is preferably adjusted in such a manner as to obtain an automatic firing movement of the firing pin during the descending portion of the projectile flight in order to cause a systematic destruction of any projectile which failed to encounter its objective.

In the embodiment of the invention shown in Figs. 12 to 18, the locking balls 107 of the firing pin 104 rest upon a bearing 109 (Fig. 14) formed by a conical end of a primer-holder 125. The internal surface of the firing pin 104 by which it bears against the balls 107 comprises also a conical surface 126 so that when the balls separate from the firing pin under the effect of centrifugal force, the balls 107 drive the firing pin forward.

The bushing 110ª is normally maintained in locking position of the balls 107 by a spring 111 which rests, by its other end, on the fuse body 101. The bushing 110ª may longitudinally slide in a cavity of the fuse nose which comprises two borings with different diameters which are united by a conical part 127. The balls 108 are disposed in lodgments 114 which open outward, so that the balls may engage the internal walls of the fuse nose 102.

According to the illustrated example, the primer-holder 125 may slide and is axially guided along a heel 128 of the fuse body. The lower end of this heel comprises preferably a curved part 129 against which the bushing 110ª is intended to abut by its lower slender end, at the moment of firing. Thus, the edge of the bushing is forced inward and causes the hooking of the bushing 110ª over the primer holder 125.

When the fuse is at rest, (Fig. 12) the firing pin may be maintained immobile against the balls 107 by any convenient means. According to the present example the means comprises a tongue 130 cut out in the bottom of the firing pin and bent outwards, in such a manner as to form a resilient bearing for that pin against the plate 119.

Figure 12:
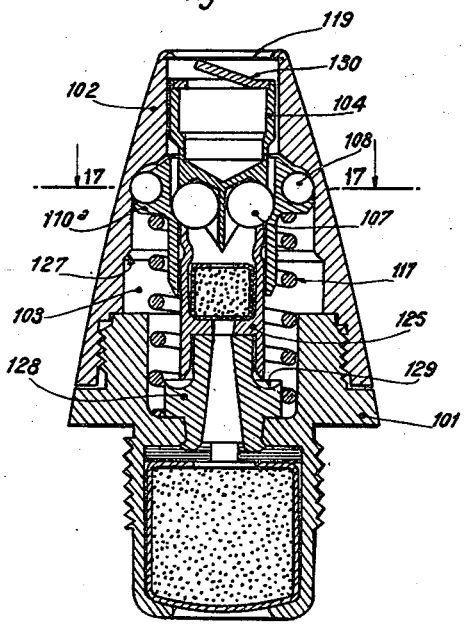
Figure 12 is an axial section of another embodiment of the invention, the fuse being shown at rest.

The operation is as follows. When the fuse is at rest, the balls 107 are retained in locking position by the bushing 110ª (Fig. 12).

Figure 13:
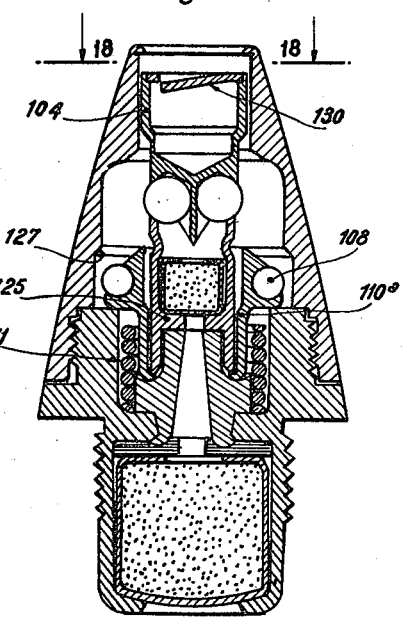
Figure 17:
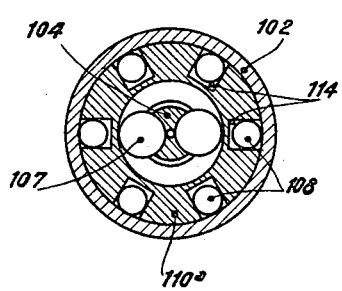
Figure 17 is a cross section on the line 17—17 of Fig. 12.
Figure 18:
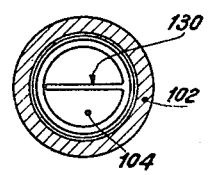
Figure 18 is a cross section on the line 18—18 of Fig. 14.

At the moment of firing, the parts assume by inertia the position of Fig. 13. The bushing 110ª remains back while compressing its spring 111 and hooks itself by its lower edge over the primer-holder 125. It carries away in the same time, the balls 108 which are thus driven back under the shoulder 127. The firing pin 104 bears upon the balls 107 while the tongue 130 is bent inward.

When the positive acceleration of the projectile has ceased (Fig. 14) the balls 107 and 108 separate from the firing pin, under the effect of centrifugal force. The balls 108 engage then the shoulder 127 and retain the bushing 110ª in rear position against the action of the spring 111. The firing pin moves forward and abuts against the plate 119, as in the embodiment of Fig. 5. From this moment forth, the fuse is armed or cocked and a very light obstacle is sufficient for causing the projection of the firing pin into the primer (Fig. 15).

In case, on the contrary, the projectile pursues its trajectory and fails to encounter its objective, the automatic operation of the fuse takes place as in the above mentioned example, as soon as the centrifugal force of the balls 108 becomes insufficient to overcome the force of the spring 111, which then projects the primer holder 125 into the firing pin 104 (Fig. 16).

In the present construction, the spring 111 remains always unbent while the fuse is at rest, a feature which preserves its elasticity.

Though in the above illustrated examples, the balls 107 and 108 have been shown in individual lodgings of the bushing, I wish to state that this arrangement is not absolutely necessary for the operation of the fuse. The balls 107 and 108 may also be placed, for example, in a simple circular groove. However, the illustrated arrangement is preferred by me because it assures an uniform distribution of the balls and thus prevents any cause of unbalancing in the fuse.

I may also without changing the principle of the above mentioned operation, cause the hooking of the bushing 110ª over the primer-holder 125 by the aid of any appropriate means different from those illustrated.

I may as well invert the position of the firing pin with that of the primer holder.

The balls 107 and 108 may also be replaced by centrifugal elements of a different form playing the same part.

The fuse according to the invention may also be used for measuring the decrease of the rotary speed of projectiles over their course of flight. In this case, the operation of the fuse having been adjusted for a predetermined rotary speed of the balls, observers look on what point of the trajectory the bursting of the projectile occurs. By varying the compression of the spring 111 by the aid of a suitable device, the predetermined speed for which the unlocking of the device occurs may be varied and it is thus possible to draw the curve of the decreasing rotation speed as a function of the length of the projectile trajectory. The fuse operates, in this case, as a time fuse.

Naturally the invention is not limited to the forms of construction illustrated and described, since such are given only by way of example.

Having thus described my invention, what I claim as new and desire to secure by Letters Patent, is:—

1. Mechanical delay fuse for rotative projectiles, comprising a body, a firing pin element and a primer element in said body, at least one of said elements being movable toward the other for detonating said primer element, a bolt for holding said elements apart during transport and handling and adapted to be operated by centrifugal force for retaining the firing elements away from one another during a given part of the flight while the rotative speed of the projectile is greater than a predetermined value and being subsequently moved when the speed falls below said value under the braking effect of the fluid through which the projectile travels for liberating them, and detonating means for bringing said elements together upon said liberation.

2. Mechanical delay fuse for rotative projectiles, comprising a body, a firing pin element and a primer element in said body, at least one of said elements being movable toward the other for detonating said primer element, a bolt for holding said elements apart during transport and handling and adapted to be operated by centrifugal force for retaining the firing elements away from one another during a given part of the flight while the rotative speed of the projectile is greater than a predetermined value and being subsequently moved when the speed falls below said value under the braking effect of the fluid through which the projectile travels for liberating them, and a spring for bringing said elements together upon said liberation.

3. Mechanical delay fuse for rotative projectiles, comprising a hollow body having an internal abutment, a firing pin element, a primer element, at least one of said elements being movable toward the other for detonating the primer element and having a cavity, a ball normally engaged with said abutment and the wall of said cavity for holding the same against movement during transport and handling and adapted to be operated by centrifugal force for retaining said movable element against movement during a given part of the flight while the rotative speed of the projectile is greater than a predetermined value, and being subsequently moved when the speed falls below said value under the braking effect of the fluid through which the projectile travels for liberating said movable element, and detonating means for bringing said elements together upon said liberation.

4. Fuse according to claim 1, including complementary safety devices for retaining the firing elements in inactive position during transport and handling, said complementary devices being moved out of safety position at firing.

5. Fuse according to claim 1, including complementary safety devices cooperating with the bolt for holding said bolt against movement, said complementary devices being moved out of safety position at firing.

6. Fuse according to claim 1, including complementary safety devices cooperating with the bolt for holding said bolt against movement, said devices being moved out of safety position by inertia upon the shock of firing.

7. Fuse according to claim 1, including complementary safety devices cooperating with the bolt for holding said bolt against movement, said devices being moved out of safety position by inertia upon the shock of firing, said devices being free to return by inertia into safety position when said fuse is retarded in its projective movement prior to the liberating movement of said bolt.

8. Mechanical delay fuse for rotative projectiles, comprising a body, a firing pin element and a primer element in said body, one of said elements being movable toward the other for detonating said primer element, a bolt holding said elements apart during transport and handling and adapted to be operated by centrifugal force for retaining the firing elements away from one another during a given part of the flight while the rotative speed of the projectile is greater than a predetermined value and being subsequently moved when the speed falls below said value for liberating them, detonating means for bringing said elements together upon said liberation, a device for normally preventing inward movement of said bolt being movable at firing into a position for permitting inward movement of the bolt, and an elastic element for moving said bushing toward the tip of the fuse.

9. Fuse according to claim 1, including a second firing pin adapted to be moved upon impact, and safety devices for latching said second firing pin against movement so long as the rotative speed of the fuse body is below a predetermined value, and being centrifugally operated when the speed is above said value for movement into a position for permitting movement of said firing pin.

10. Mechanical delay fuse for rotative projectiles, comprising a body, a firing pin element and a primer element in said body, one of said elements being movable toward the other for detonating said primer element, a bolt engageable with said movable element and with said body for latching said movable element against firing movement, a first auxiliary safety device for normally preventing movement of said bolt from its latching position during transport and handing and being displaced from normal position by inertia at firing, a second auxiliary safety device displaceable by inertia at firing into position for maintaining said bolt in its latching position during the positive acceleration upon firing, said bolt being energized by centrifugal force so long as the rotative speed of the projectile is greater than a predetermined value whereby said bolt remains in latching position, elastic means for moving said second safety device from safety to bolt-releasing position upon cessation of the positive acceleration, said bolt moving from its combined engagement with said body and movable element when the rotative speed falls below said predetermined value whereby to liberate said moving element, and detonating means for bringing said elements together upon said liberation.

11. A fuse as in claim 10, including a device for securing said first and second safety devices together whereby said first device is held in its moved position relative to said second device following the action of inertia thereon during positive acceleration, said securing device being released upon a retarding movement of the fuse body during flight, whereby it may again move into safety position to prevent the unlatching movement of said bolt.

12. A fuse as in claim 10, including a device for securing said first and second safety devices together whereby said first device is held in its moved position relative to said second device following the action of inertia thereon during positive acceleration, said securing device being released upon a retarding movement of the fuse body during flight whereby it may again move into safety position to prevent the unlatching movement of said bolt, said elastic means operating between said fuse body and said first device whereby to assist the return of the latter upon such retardation, and also operating through said first device and securing device upon said second device to return the latter into its unlatching position.

13. A fuse according to claim 1, in which the firing pin element and the primer element are adapted to cause also the ignition of the fuse under the effect of the impact.

14. A fuse according to claim 1, including a spring adapted both to cause the automatic operation of the fuse and to maintain the bolt in locking position during transport and handling.

15. A fuse according to claim 1, in which one of the firing elements, which is forwardly positioned relative to the other firing element is arranged in such a manner as to be maintained, by the action of the negative acceleration given to the projectile by the air resistance, engaged with a closing plate fixed in the forward part of the fuse.

16. A fuse according to claim 1, in which the bolt comprises a bushing having radially extending and uniformly distributed lodgings into which may enter locking balls of the fuse, the said bushing being urged by a spring in such a position that the said lodgings are normally situated apart from the balls, the arangement being such that, after the positive acceleration of the projectile has ceased, the balls push the bushing away, under the effect of centrifugal force, against the action of the spring, the balls entering then in the lodgings, thus causing the fuse to be cocked.

17. A fuse according to claim 1, in which the bolt comprises a bushing having radially extending and uniformly distributed lodgings into which may enter locking balls of the fuse, the said bushing being urged by a spring in such a position that the said lodgings are normally situated apart from the balls, the arrangement being such that, after the positive acceleration of the projectile has ceased, the balls push the bushing away, under the effect of centrifugal force, against the action of the spring, the balls entering then in the lodgings, thus causing the fuse to be cocked; the arrangement being such that after the balls have entered into their radially extending lodgings they act upon a shoulder of the fuse for keeping the spring compressed, through the medium of the bushing, up to the moment when the centrifugal force becomes insufficient to overcome the action of the spring which then projects the firing pin onto the primer.

18. A fuse according to claim 1, in which the bolt comprises a bushing having radially extending and uniformly distributed lodgings into which may enter locking balls of the fuse, the said bushing being urged by a spring in such a position that the said lodgings are normally situated apart from the balls, the arrangement being such that, after the positive acceleration of the projectile has ceased, the balls push the bushing away, under the effect of centrifugal force, against the action of the spring, the balls entering then in the lodgings, thus causing the fuse to be cocked; the said bushing containing another set of balls disposed in lodgings situated near by the above mentioned lodgings; the latter set of balls tending, when the fuse is at rest, to lock the first balls both in longitudinal and lateral directions and then cooperating with said balls for retaining the mechanical delay device in cocked position up to the moment of operation.

19. A fuse according to claim 1 in which the bolt comprises a bushing adapted to lock in safety position a set of balls; said bushing resting rearwards upon a spring and being so arranged as to come to hook itself, at the moment of firing, over a displaceable primer-holder; the bushing and the primer holder being afterwards kept apart from the firing pin element, after the fuse has been armed, by a second set of balls disposed in lodgings of the bushing and bearing upon a shoulder of the fuse body up to the moment when the centrifugal action of the balls becomes insufficient to overcome the action of the spring which then projects the primer element onto the firing pin element.

20. A fuse according to claim 1, including a resilient tongue in the firing pin element, which maintains said element apart from a closing plate of the fuse when the fuse is at rest; said tongue being bent inward by inertia, at the moment of firing.

21. In a mechanical delay fuse for rotative projectiles, a body, a firing pin element and a primer element in said body, at least one of said elements being movable toward the other for detonating said primer element, detonating means for automatically bringing said firing elements together, and locking means controlled according to the rotative speed during flight for retaining said detonating means against firing movement during a given part of the flight while the rotative speed of the projectile is greater than a predetermined value, said locking means being subsequently moved when the speed falls below said value under the braking effect of the fluid in which the projectile travels for liberating the detonating means.

22. In a mechanism delay fuse for rotative projectiles, a body, a firing pin element and a primer element in said body, at least one of said elements being movable toward the other for detonating said primer element, detonating means including a spring for automatically bringing said firing elements together, and locking means for retaining said detonating means against firing movement during a given part of the flight while the rotative speed of the projectile is greater than a predetermined value, said locking means being subsequently moved when the speed falls below said value under the braking effect of the fluid in which the projectile travels for liberating the detonating means.

23. In a mechanical delay fuse for rotative projectiles, a body having an abutment, a firing pin element and a primer element in said body, at least one of said elements being movable toward the other for detonating said primer element, detonating means for automatically bringing said firing elements together, and locking means comprising balls cooperating with said abutment of the body for retaining said detonating means against firing movement during a given part of the flight while the rotative speed of the projectile is greater than a predetermined value, said locking means being subsequently moved when the rotative speed falls below said value under the braking effect of the fluid in which the projectile travels for liberating the detonating means.

24. In a mechanical delay fuse for rotative projectiles, a body having an abutment, a firing pin element and a primer element in said body, at least one of said elements being movable toward the other for detonating said primer element, detonating means comprising a spring for automatically bringing said firing elements together, and locking means comprising balls cooperating with said abutment of the body for retaining said detonating means against firing movement during a given part of the flight while the rotative speed of the projectile is greater than a predetermined value, said balls being pushed away from said abutment by the spring as soon as the rotative speed falls below said value under the braking effect of the fluid in which the projectile travels, the said spring simultaneously therewith and automatically bringing the firing elements together.

25. Combined percussion and mechanical delay fuse for rotative projectiles, comprising a body, a firing pin element and a primer element in said body, at least one of said elements being movable toward the other for detonating said primer element, a safety device and means to move the same out of safety position when the projectile has reached a predetermined point in the trajectory so that the fuse is thereafter armed and ready to operate by percussion against an obstacle, detonating means for automatically bringing said firing elements together, and locking means controlled according to the rotative speed during flight for retaining said detonating means against firing movement during a given part of the flight while the rotative speed of the projectile is greater than a predetermined value, said locking means being subsequently moved when the speed falls below said value under the braking effect of the fluid in which the projectile travels for liberating the detonating means.

26. Combined percussion and mechanical delay fuse for rotative projectiles, comprising a body, a firing pin element and a primer element in said body, at least one of said elements being movable toward the other for detonating said primer element, a safety device for holding said element apart normally and constructed and arranged to be moved out of safety position when the projectile has reached a predetermined point in the trajectory so that the fuse is thereafter armed and ready to operate by percussion against an obstacle, detonating means comprising a spring for automatically bringing said firing elements together, and locking means controlled by the rotative speed during flight for retaining said detonating means against firing movement during a given part of the flight while the rotative speed of the projectile is greater than a predetermined value, said locking means being subsequently moved when the speed falls below said value under the braking effect of the fluid in which the projectile travels for liberating the detonating means.

27. Combined percussion and mechanical delay fuse for rotative projectiles, comprising a body having an abutment, a firing pin element and a primer element in said body, at least one of said elements being movable toward the other for detonating said primer element, a safety device for holding said elements apart normally and moved out of safety position when the projectile has reached a predetermined point in the trajectory so that the fuse is thereafter armed and ready to operate by percussion against an obstacle, detonating means for automatically bringing said firing elements together, and locking means comprising balls cooperating with said abutment of the body for retaining said detonating means against firing movement during a given part of the flight while the rotative speed of the projectile is greater than a predetermined value, said locking means being subsequently moved when the speed falls below said value under the braking effect of the fluid in which the projectile travels for liberating the detonating means.

28. Combined percussion and mechanical delay fuse for rotative projectiles comprising a body having an abutment, a firing pin element and a primer element in said body, one at least of said elements being movable toward the other for detonating said primer element, a safety device for holding said elements apart during transport and handling, said safety device being moved out of the safety position when the projectile has reached a predetermined point in the trajectory so that the fuse is thereafter armed and ready to operate by percussion against an obstacle, detonating means comprising a spring for automatically bringing said firing elements together, and locking means comprising balls cooperating with said abutment of the body for retaining said detonating means against firing movement during a given part of the flight while the rotative speed of the projectile is greater than a predetermined value, said balls being pushed away from said abutment by the spring as soon as the rotative speed falls below said value under the braking effect of the fluid in which the projectile travels, the said spring simultaneously therewith and automatically bringing the firing elements together.

In testimony whereof, I affix my signature.

EDGAR WILLIAM BRANDT.